US012748410B2

(12) United States Patent
Bell et al.

(10) Patent No.: US 12,748,410 B2
(45) Date of Patent: Sep. 29, 2026

(54) METHOD FOR CONTROLLING CONVEYOR VEHICLES AND CONVEYING SYSTEM

(71) Applicant: Dürr Systems AG, Bietigheim-Bissingen (DE)

(72) Inventors: Stefano Bell, Kornwestheim (DE); Johannes Bayha, Winnenden (DE); Michael Lauer, Bietigheim-Bissingen (DE); Benny Frasch, Hemmingen (DE); Marcus Schneider, Walheim (DE); Lazaros Zachariadis, Bietigheim-Bissingen (DE)

( * ) Notice: Subject to any disclaimer, the term of this patent is extended or adjusted under 35 U.S.C. 154(b) by 90 days.

(21) Appl. No.: 18/549,320

(22) PCT Filed: Mar. 10, 2022

(86) PCT No.: PCT/DE2022/100199
§ 371 (c)(1),
(2) Date: Sep. 6, 2023

(87) PCT Pub. No.: WO2022/188929
PCT Pub. Date: Sep. 15, 2022

(65) Prior Publication Data

US 2024/0160226 A1 May 16, 2024

(30) Foreign Application Priority Data

Mar. 10, 2021 (DE) ..................... 10 2021 202 323.1

(51) Int. Cl.

| | |
|---|---|
| ***G05B 19/418*** | (2006.01) |
| *G05D 101/10* | (2024.01) |
| *G05D 107/70* | (2024.01) |

(52) U.S. Cl.
CPC ... *G05B 19/41895* (2013.01); *G05D 2101/10* (2024.01); *G05D 2107/70* (2024.01)

(58) Field of Classification Search
CPC ............... G05D 1/644; G05D 2101/10; G05D 2107/70; G05B 19/41895;
(Continued)

(56) References Cited

U.S. PATENT DOCUMENTS 10,216,193 B2 2/2019 Gupta et al.
2010/0296908 A1* 11/2010 Ko ........................ B66F 9/0755 414/800

(Continued)

FOREIGN PATENT DOCUMENTS

DE 102019115981 A1 6/2020
EP 2062837 A1 5/2009
EP 3561628 A1 10/2019

OTHER PUBLICATIONS

International Searching Authority, "International Search Report and Written Opinion," issued in connection with International Application No. PCT/DE2022/100199, Jun. 14, 2022, 13 pages, with English translation of the International Search Report.

(Continued)

*Primary Examiner* — Chun Cao
(74) *Attorney, Agent, or Firm* — Hanley, Flight & Zimmerman, LLC

(57) ABSTRACT

In order to provide a method for controlling conveyor vehicles of a conveying system which permits an energy-efficient and cost-efficient operation of said conveying system, it is proposed that the method comprises:
Making available a plurality of conveyor vehicles of the conveying system;
Specifying a conveying job for conveying one or more conveyed objects;
Determining a conveying job data set for controlling a conveyor vehicle when performing the conveying job;
Carrying out the conveying job.

14 Claims, 1 Drawing Sheet

(58) Field of Classification Search
CPC ........... G05B 2219/31274; G05B 2219/31277; G03G 21/1825; G03G 2221/1861; G03G 15/08; G03G 21/1814; G03G 21/1817; G03G 21/1821; G03G 2221/1654; G03G 2221/1853; B62D 65/18; G06T 19/006; G06Q 10/103; G06Q 50/10; H04N 7/15
USPC .......................................................... 700/113
See application file for complete search history.

(56) References Cited

U.S. PATENT DOCUMENTS

| | | | | |
|---|---|---|---|---|
| 2012/0330458 | A1* | 12/2012 | Weiss | B66F 9/063 901/1 |
| 2013/0096735 | A1* | 4/2013 | Byford | G05D 1/0234 701/28 |
| 2016/0129592 | A1 | 5/2016 | Saboo et al. | |
| 2018/0329426 | A1* | 11/2018 | Gupta | G05D 1/0297 |
| 2019/0115234 | A1* | 4/2019 | Ogawa | H01L 21/6773 |
| 2020/0189675 | A1 | 6/2020 | Gao et al. | |
| 2020/0216130 | A1 | 7/2020 | Von Krauland | |
| 2021/0003988 | A1* | 1/2021 | Yu | G05B 19/402 |

OTHER PUBLICATIONS

German Patent Office, “Search Report,” issued in connection with German Patent Application No. 10 2021 202 323.1, dated Feb. 3, 2023, 16 Pages. [Machine English Translation Included].

International Searching Authority, “International Preliminary Report on Patentability,” issued in connection with International Application No. PCT/DE2022/100199, issued Sep. 12, 2023, 15 pages. [English Translation Included].

European Patent Office, “European Office Action,” issued in connection with European Patent Application No. 22713860.9, dated Dec. 2, 2025, 18 pages [English translation included].

* cited by examiner

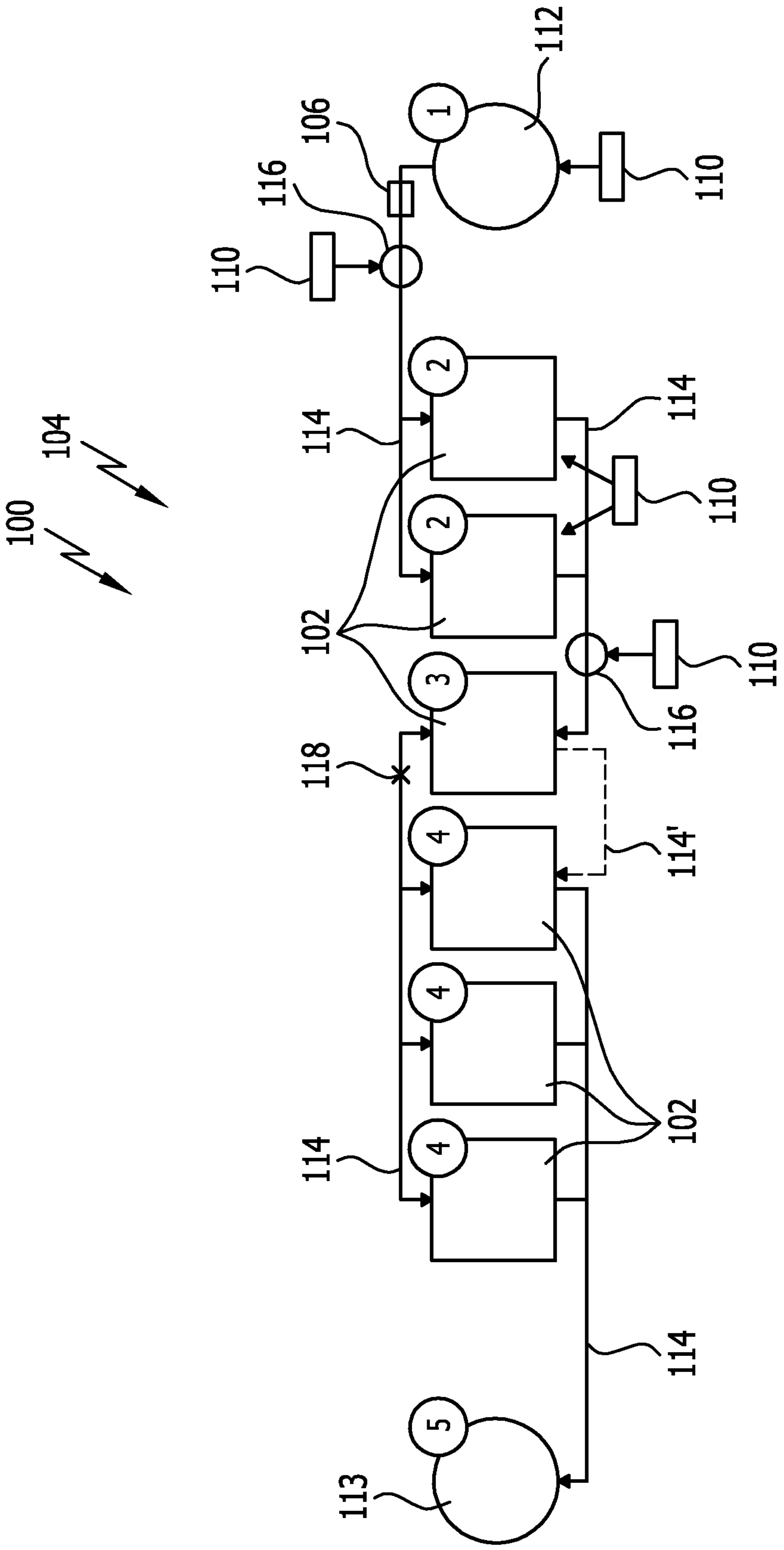
100
104
112
1
106
116
110
114
2
102
3
118
4
114'
5
113

METHOD FOR CONTROLLING CONVEYOR VEHICLES AND CONVEYING SYSTEM

RELATED APPLICATION

This application is a national Phase of international application No. PCT/DE2022/100199 filed on Mar. 10, 2022, and claims the benefit of German application No. 10 2021 202 323.1 filed on Mar. 10, 2021, which are incorporated herein by reference in their entirety and for all purposes.

FIELD OF DISCLOSURE

The present disclosure relates to a method for controlling conveyor vehicles and a conveying system for conveying conveyed objects.

BACKGROUND

Conveyor systems with conveyor vehicles can be used in particular in production facilities, for example in the manufacture of passenger cars. The conveyor vehicles serve in particular for conveyor vehicle bodies within a treatment system and/or assembly plant.

In particular when the conveying system comprises a large number of conveyor vehicles which are to transport a large number of conveyed objects, efficient control of the conveyor vehicles is essential to avoid congestion or other wait times which can lead to production disturbances.

The conveyor vehicles can, for example, be guided along predefined routes. However, such predefined routes can be problematic in particular when there are unexpected obstacles or other disturbances.

SUMMARY

The object of the present disclosure is to provide a method for controlling conveyor vehicles which enables energy-efficient and cost-efficient operation of a conveying system.

According to the disclosure, this object is achieved by a method according to claim 1.

In the method according to the disclosure for controlling conveyor vehicles of a conveying system, the following is preferably provided:

- providing a plurality of conveyor vehicles of the conveying system; and/or
- specifying a conveying job for conveying one or more conveyed objects; and/or
- determining a conveying job data set for controlling a conveyor vehicle when performing the conveying job; and/or
- carrying out the conveying job.

Preferably, a conveying job data set is accordingly determined for controlling a conveyor vehicle when performing the conveying job. The conveying job data set preferably contains configuration data, or is determined from configuration data or taking into account configuration data. Configuration data in this case are in particular properties of the conveying system and/or a higher-level production system comprising the conveying system.

For example, a conveying job data set contains a conveying path, and/or a speed profile, and/or information about stays, and/or other intermediate stops for performing the conveying job.

It can be useful if an individual conveying job data set is determined for each conveyor vehicle and/or for each conveying job. A determination of the conveying job data set can can be in particular a creation, a compilation and/or a calculation.

It can be advantageous if the conveying job data set comprises one or more conveying job-specific, and/or conveyed object-specific data, and/or if one or more of these data are taken into account when determining the conveying job data set. In particular, one or more of the following data conveying job-specific and/or conveyed object-specific data can be:

- Type of conveyed object to be conveyed, and/or
- spatial position and/or sequence of one or more stations, in particular workstations, when conveying the conveyed object; and/or
- expected and/or required time of stay of the conveyed object and/or the conveyor vehicle at a particular station The conveying job-specific and/or conveyed object-specific data are preferably independent of a current state of the conveying system, in particular the particular conveyor vehicle, and/or of the one or more, in particular all, stations.

For example, other conveying job specific and/or conveyed object specific data can be the following or can comprise one or more of the following data:

- designation of a station, in particular work station, for example production cell, treatment station, assembly station, etc.
- work steps that can be carried out in the particular station, in particular treatment steps, production steps and/or assembly steps:
- time components of conveyor engineering elements, for example cycle information of a cycle conveyor, speeds of a continuous conveyor, etc.
- Transfer times for transferring one or more conveyed objects to or from a conveyor vehicle, in particular to a station and/or from a station;
- Production steps of the conveyed object to be produced, or treatment steps of the conveyed object to be treated, or assembly steps of the conveyed object to be assembled.

It can be provided that one or more or all of the conveying job-specific and/or conveyed object-specific data are determined and/or generated from empirical values and/or measured values of completed conveying jobs and/or calibration runs.

For example, different conveying times and/or conveying durations between different stations can be determined on the basis of previous conveying runs, for example as a mean value. From this, a conveying duration for other conveying jobs can preferably be determined, in particular specified.

Furthermore, it can be provided that the conveying job data set comprises one or more state data of the current and/or expected state of the conveying system and/or one or more stations, and/or one or more of these state data are taken into account when determining the conveying job data set. For example, it can be provided that one or more of the following data are determined and/or taken into account as state data:

- current and/or expected utilization of one or more conveyor vehicles;
- current and/or expected utilization of one or more conveying route sections;
- current and/or expected utilization of one or more stations;
- current disruption-related and/or maintenance-related route closures or station failures.

For example, it can be provided that a current occupancy of individual stations and/or a remaining duration of a stay of a conveyed object located in the particular station is determined as state data and taken into account when determining the conveying job data set.

One or more or all of the state data are preferably determined on the basis of data which are provided by means of sensors and/or by transmitting current and/or expected operating parameters of one or more additional conveyor vehicles and/or one or more stations.

It can be useful if a basic conveying path and/or a basic speed profile for carrying out the conveying job are first determined on the basis of one or more conveying job-specific and/or conveyed object-specific data. At the beginning of the execution of the conveying job and/or during the execution of the conveying job, in particular before, during and/or after a stay at a station, an update and/or if necessary a correction of the basic conveying path and/or of the basic speed profile is preferably carried out, in particular depending on state data of the current and/or expected state of the conveying system and/or one or more stations yet to be approached.

In accordance with this aspect of the disclosure, rough planning of the conveying path and speed profile can therefore be performed prior to starting the execution of the conveyor job. During the execution of the conveying job, fine planning and/or correction is then carried out in particular to optimally adapt the conveyance to current circumstances and conditions.

By updating and/or by correcting the basic conveying path and/or the basic speed profile, a modified conveying path and/or a modified speed profile are preferably obtained.

Such an update and/or correction can be carried out in particular at one or more intermediate stations.

In particular, it can be provided that an update and/or correction is performed several times during the execution of a conveying job, in particular before, during and/or after a stay at a station.

It can be provided that the conveying job data set is incomplete at the beginning of the execution of the conveying job, and/or that initially at least one conveying path and/or a speed profile for complete execution of the conveying job are complete. When a specified intermediate position of the conveyor vehicle is reached, the conveying path and/or the speed profile are then preferably determined to completing them.

For example, such a determination can be provided for completion at one or more intermediate positions.

Furthermore, it can be provided that a conveying job is generated without determining or defining a final station, for example work station or production cell. In particular, a group of stations can then be defined as the probable target or intermediate destination, wherein, for example, an update or correction of the conveying route and/or the speed profile is performed at one or more intermediate positions in order to decide on the specific station to be approached. This can be provided, in particular, when at the beginning of the conveying job, it is not yet certain which station of a group of stations is available at the time of reaching the group of stations.

In one embodiment of the disclosure, it can also be provided that at least one local conveying specification and/or at least one global conveying specification is taken into account when determining the conveying job data set.

A local conveying specification applies in particular to a partial region of a conveying area of the conveying system and/or to a subset of the conveyor vehicles.

A global conveying specification preferably applies to the entire conveying area and/or for all conveyor vehicles.

Furthermore, it can be provided that a local conveying specification only applies in a specified environment of a conveyor vehicle.

In particular, one or more the following conveying specifications can be provided as a local or global conveying specification:

- minimizing the energy requirement of the conveying system; and/or
- minimizing wear of the conveying system; and/or
- maximizing the conveying speed; and/or
- optimizing the production utilization; and/or
- homogenizing the conveying route utilization; and/or
- evening out the spatial distribution of the conveyor vehicles within a global conveying area of the conveying system.

It can be useful if several of the above-mentioned conveying specifications can be selected as required by means of a control system of the conveying system.

Preferably, only one individual global conveying specification always applies to the entire conveying system at any given time in the case of a selected global conveying specification.

A currently selected global conveying specification preferably always applies to all conveyor vehicles, and/or all conveying jobs during a specified period, and/or to a selection of another global conveying specification.

In particular, the following can be provided as the conveying specification:

Minimizing the Energy Requirement of the Conveying System:

With this conveying specification, the conveying speeds are in particular reduced, and/or the shortest distances between specified stations are selected. This conveying specification can be provided in particular when a maximum conveying capacity and/or conveying speed of the conveying system does not have to be utilized due to a small number of conveying jobs.

Minimizing the Wear of the Conveying System:

With this conveying specification, in particular curve speeds of the conveyor vehicles are reduced, and/or conveying routes with the largest possible curve radii are selected. As a result, wear and/or the generation of abrasion can preferably be minimized in order to be able to operate the conveyor vehicles with extended maintenance intervals. Furthermore, an adaptation of the speed profiles can be provided depending on a conveying weight, in particular the mass of the conveyed object to be conveyed, wherein in particular a higher mass leads to a reduced speed in order to minimize the wear of the vehicles.

Maximizing the Conveying Speed:

In this conveying specification, the conveying speeds are maximized, and/or the shortest conveying routes are selected. As a result, a conveying capacity of the conveying system can be maximized.

Optimizing Production Exploitation:

With this conveying specification, in particular the speeds of the conveyor vehicles are selected depending on the utilization of the stations so that the conveyed objects preferably arrive at the stations exactly when they are free or available for receiving and treatment, production and/or the assembly of the particular conveyed object (just-in-time conveying). Furthermore, self-optimization of the conveying system, in particular of the control system and/or the conveyor vehicles, can be provided for the optimization of production utilization, in particular using artificial intelligence. Already completed conveying jobs are then evaluated in particular with regard to the conveying duration, speed profiles and/or conveying routes and are used to optimize future conveying jobs.

Equalization of Conveying Route Utilization:

Utilization optimization can be provided in particular in order to avoid congestion and/or to equalize usage of the conveying system. For example, for certain conveying route sections, an upper limit for a number of conveyor vehicles located therein or thereon at a specified point in time can be provided.

Equalizing the Spatial Distribution of the Conveyor Vehicles within the Global Conveyor of the Conveying System:

With this conveying specification as well, equalization with regard to route utilization is preferably achieved, wherein a larger number of conveying routes is preferably provided, particularly in regions with a higher conveying volume, in order to keep the route utilization of individual conveying routes as uniform as possible.

It can be advantageous if a local conveying specification and/or a global conveying specification can be varied during a conveying job. In this case, an update and/or correction is preferably triggered of a conveying path and/or speed profile, in particular of the basic conveying path, and/or of the basic speed profile or of the modified conveying path, and/or of the modified speed profile.

It can be useful if the conveying specification takes into account the prioritization of workpieces.

Furthermore, it can be useful if the conveying specification takes into account the prioritization of (work) stations.

Alternatively or in addition to this, it can be provided that the conveying specification takes into account the, in particular also at least partially variable or changing, capabilities of (work) stations with regard to their individual or special production capabilities, for example with regard to special colors, special assembly tools, availability in a shift, employees and/or floaters, etc.).

The conveying specification takes into account and/or preferably enables the predictive reservation of (work) stations for workpieces. This can mean, in particular, that a station is already reserved for a workpiece arriving in the future even though this workpiece is not yet directly at the station. Other, in particular indirect, workpieces are then preferably transferred to other stations.

It can be advantageous if the conveying specification takes into account individual manufacturing requirements for the workpiece.

The conveying specification also preferably enables absolutely free flexibility of the conveying sequence. For example, it can be provided that stations and/or processes can be skipped. Alternatively or additionally, it can be provided that stations and/or processes can be run through repeatedly and/or again. Workpieces can preferably move out of an original conveying sequence and/or be given individual, or other, or different, or additional conveying instructions, for example in order to carry out and/or approach individual, or other, or different, or additional processes, production steps or stations.

It can be provided that the conveying specification can be influenced or parameterized according to the individual requirement. For example, this can mean that the decision for the (conveying) target can be made at the start of conveying, during conveying or directly before/at the decision point (e. g., an intersection or fork) between the same or similar destinations.

The conveying specification or the time of the decision preferably has no influence on the conveying behavior, and preferably takes place seamlessly without stopping or interrupting the conveying flow.

It can be useful if the conveying specification always allows an optimum, smallest possible individual process time per station or total transit time through the processing system, which is optimal for the workpiece. This can mean, for example, that the time or stay of the workpiece in the factory can be kept as small as possible.

The conveying specification preferably excludes inefficient and unnecessary waiting times for a workpiece since the latter preferably does not have to wait for the workpiece conveyed ahead (with higher production time) as in a line production.

Preferably, the conveying specification allows maximum efficiency utilization of the station(s).

In one embodiment of the disclosure, it may be provided that the conveying job data set contains information about conveying area sections of a conveying area of the conveying system to be kept free, or is determined taking into account such information. The information about area sections to be kept free describes in particular a spatially and/or temporally limited conveying corridor for exclusive use by one or more other conveyor vehicles.

It can be useful if, after determining a conveying job data set, in particular after determining, and/or updating, and/or correcting a conveying path and/or a speed profile, one or more spatially and/or temporally limited conveying corridors are identified for exclusive use by the conveyor vehicle, wherein information relating to this is used or taken into account in the determination of future conveying job data sets for additional conveyor vehicles.

When determining and/or taking into account information about conveying area sections and/or conveying corridors to be kept clear, the control system of the conveyor system, which in particular is superordinate to all conveyor vehicles, is preferably used. The conveyor vehicles accordingly preferably do not block one another, but rather are preferably provided with a prioritization by the higher-level control system depending on the conveying job, in particular depending on a specified prioritization of conveying the particular conveyed object.

The present disclosure additionally relates to a conveying system for conveying conveyed objects.

The disclosure is based on the object of providing a conveying system which enables energy- and cost-efficient operation.

According to the disclosure, this object is achieved by the independent device claim.

The conveying system for conveying conveyed objects, in particular vehicle bodies, preferably comprises:

a plurality of self-propelled and/or driverless conveyor vehicles for receiving one or more conveyed objects;

a conveying area within which the conveyor vehicles are movable along conveying routes, in particular variable conveying routes;

a control system for selecting and/or influencing the conveying routes and/or speeds of the conveyor vehicles, wherein the control system is designed and configured to carry out the method according to the disclosure.

The conveying system according to the disclosure preferably has one or more features and/or advantages which are described in connection with the method according to the disclosure.

In particular, the conveyor vehicles preferably have control devices which are designed and configured such that the described method steps can be carried out.

The conveying system according to the disclosure is suitable in particular for use in a production system for the production of vehicles, in particular passenger cars.

The present disclosure therefore also relates to a production system for the production of vehicles, in particular passenger cars, wherein the production system comprises a conveying system according to the disclosure. In this case, the conveyed objects are in particular vehicle bodies which can be supplied by means of the conveying system in particular in succession to a plurality of stations, in particular processing stations and/or assembly stations.

The conveyor vehicles are in particular driverless industrial trucks, in particular so-called automated guided vehicles (AGV).

Alternatively or additionally, it can be provided that one or more conveyor vehicles are gantry cranes or each comprise one or more gantry cranes.

The conveyor vehicles are preferably ground-bound and/or can be moved on a floor by means of wheels.

The conveyor vehicles can in particular be used autonomously, in particular after a conveying job data set has been transmitted to the particular conveyor vehicle.

It can be useful if the conveyor vehicles are electrically driven and, for this purpose, comprise in particular an energy storage device, for example a battery storage device and/or capacitor storage device, for driving the electric drive.

As an alternative or in addition to an energy storage device, an external energy supply for driving the electric drive, in particular for directly driving the electric drive, can be provided, for example an inductive or contact-bound energy transmission from an external energy source to the particular conveyor vehicle. Contact-bound energy transmission is in particular a cable-bound energy transmission, an energy transmission by means of a sliding contact or another contacting energy transmission that closes a circuit.

It can be provided that the electric drive can be supplied with electrical energy directly by the external energy supply in order to drive the particular conveyor vehicle.

Alternatively or additionally, it can be provided that the electric drive can be supplied indirectly, in particular using an intermediate storage device, for example a battery storage device and/or capacitor storage device, by means of which the external energy supply can be supplied with electrical energy to drive the particular conveyor vehicle.

The external energy transmission can be before, and/or during, and/or after the execution of a conveying job and/or conveying operation for conveying a conveyed object. In particular, it can be advantageous if during a treatment process for treating a conveyed object, electrical energy can be supplied by means of an external power supply to an energy storage device, for example a battery storage device and/or capacitor storage device, for subsequently driving the electrical drive.

Alternatively, it can be provided that the external energy transmission takes place exclusively before and/or after the execution of one or more conveying jobs and/or conveying processes for conveying one or more conveyed objects. In particular, it can be advantageous if electrical energy can be supplied to an energy storage device, for example a battery storage device and/or capacitor storage device, exclusively before and/or after one or more treatment processes for treating one or more conveyed objects by means of an external energy supply.

A continuous operation of the conveying system can preferably be realized by suitably supplying energy.

The control system of the conveying system is in particular a fleet management system.

By means of the control system, preferably not only the movements of the conveyor vehicles, but rather also the movements of the conveyed objects are monitored and/or managed. In particular, the control system serves to control the material flow, that is to say, control the conveyance of the conveyed objects.

It can be useful if, by means of the control system, information about the spatial, and/or logical, and/or logistic position and/or orientation of one or more, in particular all, conveyor vehicles is recorded and/or monitored regularly, and/or continuously, and/or permanently. For this purpose, for example, sensor information from conveyor vehicle-based sensors, and/or conveyor vehicle-independent sensors, and/or operating data of the conveyor vehicles can be used.

Alternatively or additionally, it can be provided that, by means of the control system, information about the spatial, and/or logical, and/or logistic position and/or orientation of one or more, in particular all, conveyed objects is recorded and/or monitored regularly, and/or continuously, and/or permanently. For this purpose, for example, sensor information from conveyor vehicle-based sensors, and/or conveyor vehicle-independent sensors, and/or operating data of the conveyor vehicles can be used.

By means of the control system, an optimal utilization of all resources is preferably achieved, wherein the conveying specifications preferably ensure long-term stable and low-maintenance operation of the conveying system.

Particularly with regard to energy and/or cost-efficient operation, one or more of the following features and/or advantages can preferably be provided:

It can be useful if the conveyor vehicles, in particular the industrial trucks (AGVs), are organized and/or are structured in one or more queues after completion of a conveying specification. Preferably, it is provided that the foremost conveyor vehicle in the one or more queues and/or the conveyor vehicle with the most effective/shortest distance for the next/most recent conveyor specification travels from the queue to the workpiece to be transported.

If a conveyor vehicle leaves the queue, all additional conveyor vehicles preferably move in the queue.

The conveyor vehicles can preferably each be assigned one or more queues, in particular in each case a fixed queue or different queues.

It can be useful if the conveyor vehicles can be flexibly replaced between queues.

A size or length of the queue can preferably be individually configured.

Particularly with regard to an optimal production end and an optimal production start, preferably one or more of the following features and/or advantages can be provided:

In the case of production ends, the conveyor vehicles preferably leave the queue and are commanded and/or driven via optimized and/or as short as possible travel paths to their energy charging stations.

Conveyor vehicles that are not in the queue are preferably also commanded and/or driven to the next energy charging stations.

The particular energy charging station is preferably selected for the particular conveyor vehicle based on availability and/or occupied state, and is preferably determined anew and/or individually at each end of production.

The conveyor vehicles preferably remain on their energy charging stations until before the production start, in order not to suffer a breakdown due to a lack of energy.

In good time before the start of production, the conveyor vehicles preferably leave their energy charging stations to rejoin the queue and/or to link up with a process flow.

Production can preferably be started without loss of time; in particular preferably no waiting, non-productive, or lost times arise.

It can be advantageous if at least as many or more energy charging stations are always provided than conveyor vehicles are available.

Further preferred features and/or advantages of the disclosure are found in the following description and the drawings illustrating one embodiment.

BRIEF DESCRIPTION OF THE DRAWINGS

FIG. 1 shows a schematic representation of a production system having a conveying system for conveying conveyed objects.

DETAILED DESCRIPTION OF THE DRAWINGS

A production system shown schematically in FIG. 1, designated as a whole with 100, is used for example to manufacture workpieces such as motor vehicles.

For this purpose, the production system 100 comprises a plurality of stations 102 for carrying out treatment steps, production steps and/or assembly steps.

The stations 102 are arranged and/or constructed independently of one another, but are connected to one another by means of a conveying system 104 in such a way that conveyed objects, for example vehicle bodies, can be fed to the stations 102 in varying orders.

For this purpose, the conveying system 104 comprises, in particular, a plurality of conveyor vehicles 106, for example driverless industrial trucks which are freely movable as ground-bound vehicles on a floor, in particular a hall floor.

The conveyor vehicles 106 can accordingly travel basically any routes within a conveying area 108 of the conveying system 104.

By means of a control system 110 of the conveying system 104, which in particular is a higher-level control system 110 for controlling all conveyor vehicles 106, a conveying job can be allocated to the conveyor vehicles 106 for each conveyed object to be conveyed.

For simplicity, the control system 110 is shown several times in FIG. 1, wherein the arrows extending away from the control system 110 indicate an influence on the conveyor vehicle 106 arranged at the particular location.

As this shows by way of example, the control system 110 can on the one hand be used to act on a conveyor vehicle 106 at a start position 112.

By means of the control system 110, in particular a conveying job data set is first determined which comprises a basic conveying path and a basic speed profile for performing the conveying job.

The conveyor vehicle 106 then moves along the specified conveying path on a conveying route 114 from the start position 112 to, for example, one of two stations 102, which are designed, for example, as a production cell. After passing through several stations 102, the conveyor vehicle 106 finally reaches an end position 113.

Processing, production or assembly then takes place in the particular station 102.

Between the start position 112 and the stations 102, for example, there can be an intermediate position 116 at which the conveyor vehicle 106 can also be acted upon by means of the control system 110.

In principle, the control system 110 can be used to act on any conveyor vehicle 106, preferably wirelessly, at any point in the conveyor system 104.

For an optimized control, however, it is provided that an update and/or correction of the conveying job data set, in particular of the basic conveying path and/or of the basic speed profile, of the particular conveyor vehicle 106 by means of the control system 110 is carried out only at certain intermediate positions 116. In particular, at an intermediate position 116, the control system 110 can be used to determine which station 102 of a group of identical stations 102 is approached by the particular conveyor vehicle 106, for example depending on a current occupancy of the stations 102 of said group.

In the stations 102, and/or when leaving the stations 102, and also when arriving at a particular station 102, it is preferably likewise possible to use the control system 110 to act on the particular conveyor vehicle 106, for example in order to optimize the conveying path and/or the speed profile of the conveyor vehicle 106 depending on a current route utilization and/or station utilization. Furthermore, as is indicated by the dashed connection between the two central stations 102 in FIG. 1, an alternative conveying route 114' can be selected as required, for example if a disturbance 118, for example an obstacle, has been detected in a conveying route section of the initially specified conveying path, in particular of the basic conveying route section.

For optimizing the operation of the conveying system 104, in particular the data for creating and/or updating and/or correcting the conveying job data set are decisive. In particular, conveying job-specific and/or conveyed object-specific data can be used here which are independent of the current state of the conveying system 104.

Furthermore, state data of the current and/or expected state of the conveyor system 104 and/or one or more stations 102 are preferably used to optimize the conveyor job data set, in particular to optimize the conveying path and/or the speed profile.

As an additional optimization, it can preferably be provided that one or more conveying specifications are taken into account when determining the conveying job data set and/or when updating and/or correcting the same. In particular, these can be local conveying specifications which provide, for example in certain conveying route sections, a curve speed of the particular conveyor vehicle 106 that is reduced to minimize wear. Furthermore, these can be global conveying specifications, in order to minimize the total energy requirement of the conveying system 104, in particular when there is low utilization of the conveying system 104 from the use of reduced speeds of the conveyor vehicles 106.

Furthermore, for example, an equalization of the conveyor route utilization can be provided as a global conveying specification, wherein the conveyor vehicles 106 are distributed as uniformly as possible, in particular across the various conceivable conveying routes 114. In particular, dust formation in individual conveying route sections can thereby be avoided. Finally, the aforementioned optimization options result in energy- and cost-efficient operation of the conveying system 104 and accordingly an optimal use of the production system 100.

LIST OF REFERENCE SIGNS

100 Production system
102 Station

104 Conveying system
106 Conveyor vehicle
108 Conveying area
110 Control system
112 Start position
113 End position
114 Conveying route
116 Intermediate position
118 Disturbance

The invention claimed is:

1. A method for controlling conveyor vehicles of a conveying system, the method comprising:
- providing a plurality of conveyor vehicles of the conveying system;
- specifying a conveying job for conveying one or more conveyed objects;
- determining a conveying job data set for controlling a conveyor vehicle when performing the conveying job; and
- carrying out the conveying job, wherein the conveying job data set includes one or more of the following state data of the current and/or expected state of the conveying system and/or one or more stations, and/or one or more of these state data are taken into account when determining the conveying job data set:
  - current and/or expected utilization of the conveyor vehicles;
  - current and/or expected utilization of one or more conveying route sections;
  - current and/or expected utilization of one or more stations;
  - current disruption-related or maintenance-related route closures or station failures.

2. The method according to claim 1, wherein the conveying job data set includes one or more conveying job-specific data and/or conveyed object-specific data, and/or one or more of these data are taken into account when determining the conveying job data set, in particular one or more of the following data:
- type of conveyed object to be conveyed;
- spatial position and/or sequence of one or more stations in particular workstations, when conveying the conveyed object; or
- expected and/or required time of stay of the conveyed object and/or the conveyor vehicle at a particular station.

3. The method according to claim 2, wherein one or more or all of the conveying job-specific and/or conveyed object-specific data are determined and/or generated from empirical values and/or measured values of completed conveying jobs and/or calibration runs.

4. The method according to claim 1, wherein one or more or all of the state data are determined on the basis of data which are provided by sensors and/or by transmitting current and/or expected operating parameters of one or more additional conveyor vehicles and/or one or more stations.

5. The method according to claim 1, wherein a basic conveying path and/or a basic speed profile for carrying out the conveying job is first determined on the basis of one or more conveying job-specific and/or conveyed object-specific data, and at the beginning of the execution of the conveying job and/or during the execution of the conveying job, in particular before, during and/or after a stay at a station, an update and/or if necessary a correction of the basic conveying path and/or of the basis speed profile is carried out, in particular depending on state data of the current and/or expected state of the conveying system and/or one or more stations yet to be approached.

6. The method according to claim 5, wherein by updating and/or by correcting the basic conveying route and/or the basic speed profile, a modified conveying route and/or a modified speed profile are obtained.

7. The method according to claim 1, wherein the conveying job data set is incomplete at the beginning of the execution of the conveying job, and/or initially at least one conveying path and/or a speed profile for complete execution of the conveying job are incomplete, wherein, when a specified intermediate position of the conveyor vehicle is reached, the conveying path and/or the speed profile are determined to completing them.

8. The method according to claim 1, wherein at least one local conveying specification and/or at least one global conveying specification is taken into account when determining the conveying job data set, wherein a local conveying specification for a partial region of a conveying area of the conveying system and/or for a subset of the conveyor vehicles applies, and wherein a global conveying specification applies for the entire conveying area and for all conveyor vehicles.

9. The method according to claim 8, wherein one or more the following are provided as a local or global conveying specification:
- a) minimizing the energy requirement of the conveying system;
- b) minimizing wear of the conveying system;
- c) maximizing the conveying speed;
- d) optimizing production utilization;
- e) homogenizing the conveying route utilization; and/or
- f) evening out the spatial distribution of the conveyor vehicles within a global conveying area of the conveying system.

10. The method according to claim 8, wherein a local conveying specification and/or a global conveying specification can be varied able during a conveying job, wherein this triggers an update and/or correction of a conveying path and/or speed profile, in particular of the basic conveying path and/or the basic speed profile, or the modified conveying path and/or the modified speed profile.

11. The method according to claim 1, wherein the conveying job data set contains information about conveying area sections of a conveying area of the conveying system to be kept free, or is determined taking into account such information wherein this information describes in particular a spatially and/or temporally limited conveying corridor for exclusive use by one or more other conveyor vehicles.

12. The method according to claim 1, wherein, after determining a conveying job data set, in particular after determining and/or updating and/or correcting a conveying path and/or a speed profile, one or more spatially and/or temporally limited conveying corridors are identified for exclusive use by the conveyor vehicle, wherein information relating to this is used or taken into account in the determination of future conveying job data sets for additional conveyor vehicles.

13. A conveying system for conveying conveyed objects, in particular vehicle bodies, the conveying system comprising:
- a plurality of self-propelled and/or driverless conveyor vehicles for receiving one or more conveyed objects;
- a conveying area within which the conveyor vehicles are movable along conveying routes;

a control system for selecting and/or influencing the conveying routes and/or speeds of the conveyor vehicles, wherein the control system is configured to:

provide a plurality of conveyor vehicles of the conveying system;

specify a conveying job for conveying the one or more conveyed objects;

determine a conveying job data set for controlling a conveyor vehicle when performing the conveying job; and carry out the conveying job, wherein the conveying job data set includes one or more of the following state data of the current and/or expected state of the conveying system and/or one or more stations, and/or one or more of these state data are taken into account when determining the conveying job data set:

current and/or expected utilization of the conveyor vehicles;

current and/or expected utilization of one or more conveying route sections;

current and/or expected utilization of one or more stations;

current disruption-related or maintenance-related route closures or station failures.

14. A production system for producing vehicles, in particular passenger cars, wherein the production system includes a conveying system according to claim 13 for conveyor vehicle bodies, wherein the vehicle bodies can be supplied by the conveying system in particular in succession to a plurality of stations designed as processing stations and/or assembly stations.

* * * * *